(No Model.)

C. M. FAIRBANKS.
METHOD OF CUTTING THREE CORNERED FILES.

No. 304,307. Patented Sept. 2, 1884.

A.

B.

WITNESSES.
Charles H. Titus
James D. O'Hern

INVENTOR.
C. M. Fairbanks
By Walter B. Vincent Atty

UNITED STATES PATENT OFFICE.

CRAWFORD M. FAIRBANKS, OF LINCOLN, RHODE ISLAND.

METHOD OF CUTTING THREE-CORNERED FILES.

SPECIFICATION forming part of Letters Patent No. 304,307, dated September 2, 1884.

Application filed January 7, 1884. (No model.)

*To all whom it may concern:*

Be it known that I, CRAWFORD M. FAIRBANKS, of Lincoln, in the county of Providence and State of Rhode Island, have made certain new and useful Improvements in the Method of Making Three-Square Files; and I do hereby declare that the following specification, taken in connection with the drawings making a part of the same, is a full, clear, and exact description thereof.

Figure 1:
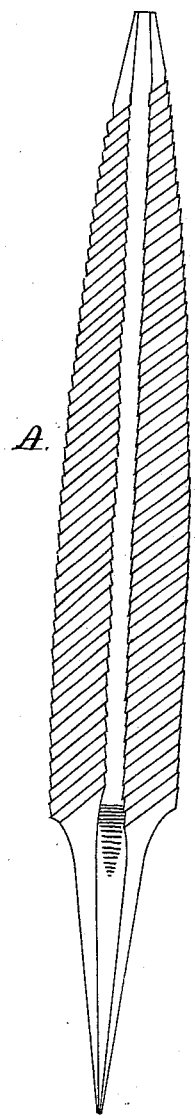
Figure 2:
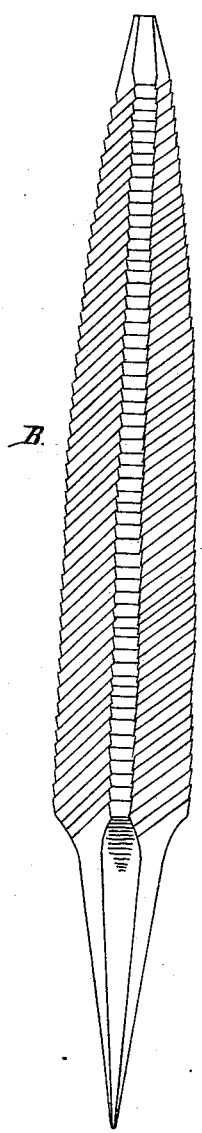

Figure 1 is a section of a three-square file-blank with its faces cut. Fig. 2 is a view of same with edges cut.

The object of my invention is to produce a three-square file which shall be superior in quality and more effective in its operation than those now in use; and it consists in the method of cutting the same hereinafter described.

The durability and effectiveness of a three-square file resides, as is well understood, in its edges or corners. As soon as they become worn, the file is practically worthless, however perfect the sides or faces may remain.

The method heretofore employed in the manufacture of three-square files is to first cut the corners or edges, and afterward the sides or faces, it having been customary with some manufacturers to strip off the burr developed by the cutting of the edge before proceeding to cut the sides or faces. This order of cutting results in disturbing, breaking, weakening, and injuring the teeth upon the edges or corners where the greatest strength and durability are required. Such cutting leaves the edges with a burr or series of ragged points, instead of strong regular teeth, which are essential to the proper behavior and wear of the file. It will be readily seen that it would be impossible to make a tool, or operate a machine with such nicety, that the faces could be cut and the corners of the teeth upon the edges remain untouched and uninjured, and that any disturbance of the corners of such teeth, which at best are very small and narrow, must result in a material detraction from their strength and efficiency. In my invention I reverse the order of cutting, and first cut the file-blank A upon its faces, as shown in Fig. 1. After the faces are cut, I consider it preferable, though not absolutely necessary to a good result, to remove the burr at the corners or edges before proceeding to cut the latter. The faces being cut and the burr removed, as described, I cut the corners or edges, thus completing the file, as shown by B, Fig. 2. This method of cutting the file gives me upon the edges strong, perfect, and durable teeth, which cannot be obtained from the method of cutting heretofore employed. Such burring or disturbance of the corners of the face-teeth as may result from this method of cutting is of little or no practical importance, for the reason that such injury is not appreciable when compared with the length of the teeth. By my method of cutting I place the strong and perfect teeth where they are the most needed to secure both the best results and the greatest durability.

What I claim as my invention, and desire to secure by Letters Patent, is—

The method of cutting three-square files herein described, consisting of first cutting the sides or faces thereof and subsequently the edges, in the manner and for the purposes substantially as specified.

CRAWFORD M. FAIRBANKS.

Witnesses:
WALTER B. VINCENT,
CHARLES H. TITUS.